United States Patent [19]

Cheng et al.

[11] Patent Number: 4,772,785
[45] Date of Patent: Sep. 20, 1988

[54] DYNAMIC RANGE COMPRESSION/EXPANSION OF LIGHT BEAMS BY PHOTOREFRACTIVE CRYSTALS

[75] Inventors: Li-Jen Cheng, La Crescenta; Hua-Kuang Liu, South Pasadena, both of Calif.

[73] Assignee: The United States of America as repesented by the Administrator, National Aeronautics and Space Administration, Washington, D.C.

[21] Appl. No.: 125,021

[22] Filed: Nov. 24, 1987

[51] Int. Cl.[4] ............................................. H01J 3/14
[52] U.S. Cl. .................................... 250/216; 350/354
[58] Field of Search ............... 250/216, 571; 350/353, 350/354, 355, 356

[56] References Cited

U.S. PATENT DOCUMENTS 4,508,431  4/1985  Henshaw ............................ 350/354
4,585,301  4/1986  Bialkowski ......................... 350/354
4,720,176  1/1988  Klein et al. ........................ 350/353

Primary Examiner—David C. Nelms
Assistant Examiner—Crystal Cooper
Attorney, Agent, or Firm—Paul F. McCaul; John R. Manning; Thomas H. Jones

[57] ABSTRACT

Apparatus is provided which greatly reduces the intensity of bright portions of an image while only moderately reducing the brightness of dimmer portions of the image, to thereby compress the range of light intensities to facilitate detection of the image. The apparatus includes a light detector device formed by a chip of photorefractive material. A two-dimensional array of light beams from an object to be detected, passes through a beam splitter to form two arrays of light beams. The two arrays of light beams are directed at different angles against a surface of the chip of photorefractive material, the two arrays of light beams forming coincident images on the surface. One of the two-dimensional arrays of beams emerging from an opposite surface of the chip has a lower range of intensities, to facilitate detection of the object despite very bright spots on its image. The other array of light beams energing from the chip has a greater range of intensities than the unprocessed image of the object.

9 Claims, 2 Drawing Sheets

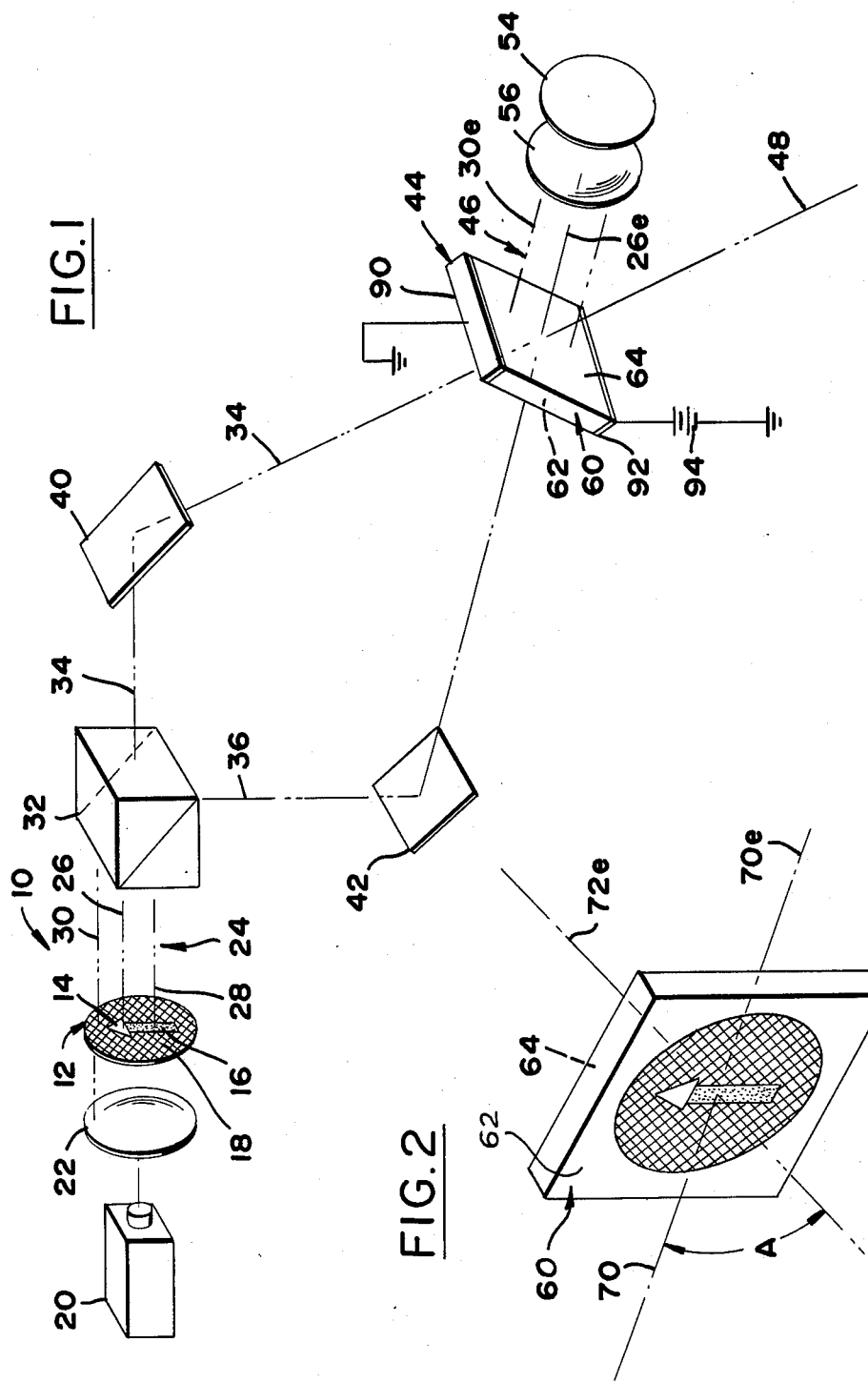

DYNAMIC RANGE COMPRESSION/EXPANSION OF LIGHT BEAMS BY PHOTOREFRACTIVE CRYSTALS

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

When two portions of a coherent light beam are directed at different angles against a surface of a chip of photorefractive material, light from one of the beams is tranferred to the other beam. Thus, one of the beams passing through the chip and emerging from an opposite surface of the chip has a reduced intensity, while the other beam that has passed through the chip and emerged has an increased intensity.

A two-dimensional array of beams representing the image of an object, can include beams of such a large range of intensities that sensors cannot detect the complete intensity range. One example is the detection of objects in a landscape by directing an intense beam at the landscape and forming an image of the landscape onto a video camera sensor surface. If there is a mirror-like reflecting surface in the landscape, light from such a reflecting surface may be so intense or bright compared to the rest of the landscape, that the camera sensor is overwhelmed and "blooming" occurs which degrades the portion of the image around the bright spot. Even if only the bright region is affected by the sensor, this is deleterious because the sensor does not indicate differences in brightness between extremely bright and very bright areas. An apparatus which could compress the range of intensities of the rays of light representing an image, as by amplifying (possibly by less than 1.0) very bright rays by much less than dim rays, would facilitate image detection by available sensors.

SUMMARY OF THE INVENTION

In accordance with one embodiment of the present invention, an apparatus is provided for the amplification of light at different portions of an image, as a nonlinear function of the intensity of the light at those image portions to produce compression or expansion of the range of intensities. The apparatus includes a light transfer device formed of a photorefractive material. A two-dimensional array of light beams representing an image of an object, or of light to be detected, is directed in a first direction at a surface of the light transfer device, to form an image on that surface. A second group of light beams is directed at a different angle against the surface of the light transfer device on which the image of the first array of light beams has been formed. The light transfer device transfers light from one array of beams to the other, in an amount dependent upon the intensity of the light beams. One of the array of light beams emerging from an opposite surface of the light transfer device has a lower range of light intensities, which facilitates detection of the image of an object that includes a wide range of light intensities. The other array of light beams emerging from the light transfer device has a greater dynamic range than exists in the original image of the object, and can be useful for special applications.

The two arrays of light beams can each represent the image of the object to be detected by splitting an original array of light beams from the object and directing the two resulting components of the array at different angles to a surface of the light transfer device, with the images formed by the two arrays of light beams being coincident on the surface of the light transfer device. The light transfer device can include an electric field extending parallel to the surface of the device, to enhance the nonlinearity of amplification of light.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of apparatus for nonlinearly amplifying light, constructed in accordance with one embodiment of the present invention.

FIG. 2 is a perspective view of a portion of the apparatus of FIG. 1.

DESCRIPTION OF THE PREFERRED EMBODIMENTS

Figure 3:
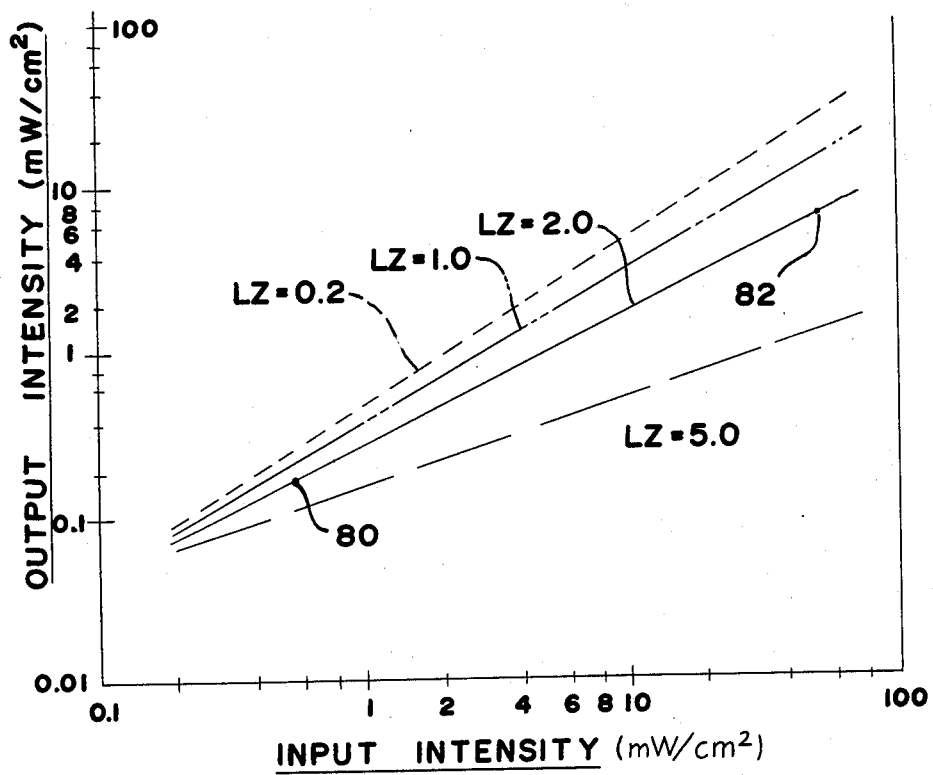
FIG. 3 is a graph showing the variation in output light intensity with input light intensity, for different light transfer devices of the apparatus of FIG. 1.

FIG. 1 illustrates a system 10 for detecting light representing the image of an object 12. In this example, the object 12 is a transparency and has three areas including an arrowhead 14 which is about 100% transparent, an arrow shaft 16 which is about 10% transparent, and a background area 18 which is about 1% transparent. Coherent light from a laser 20 is collimated by a lens 22 and passes through the object 12. The light emerging from the object 12 can be considered to comprise a group of light beams 24, including intense light beams 26 representing the arrowhead, moderate intensity light beams 28 representing the arrow shaft, and dim light beams 30 representing the background. The group of light beams 24 can represent an image of the object. The group of light beams passes through a beam splitter 32 which divides it into second and third groups of light beams 34, 36 which each represent the image of the object 12, but which are each of less intensity than the first group of light beams 24. A pair of mirrors 40, 42 direct the second and third groups of light beams onto a light transfer device 44.

Two groups of light beams 46, 48 emerge from the light transfer device, the first emerging group 46 being less intense than the other group 48. The brightest beams 26e of the first emerging group, represent the head of the arrow and are brighter than the dimmest emerging beams 30e that represent the background. However, the ratio of brightness of the beams 26e, 30e is much less than in the original group of beams 24. For example, the ratio of brightnesses of the beams 26e, 30e may be 10:1, as compared to the ratio of brightnesses of the original beams 26, 30 of 100:1. The emerging group of beam 46 is focused by a lens 56 onto a detector 54 which may be the detector of a video camera. The detector only has to detect light over a limited range of intensities, so that very bright lights will not cause blooming that degrades much of the rest of the image around the very bright spots.

The light transfer device 44 includes a chip 60 of a photorefractive material having a front surface 62 on which the second and third groups of light beams 34, 36 are incident, and having a rear surface 64 from which the groups of light beams 46, 48 emerge. The photorefractive material can be formed of any of several types of crystalline materials, including compound semiconductors such as GaAs, CdTe, and InP and other materials such as BSO, BGO, BaTiO$_3$, and LiNbO$_3$. The materials should be semi-insulating and have sufficient doping or the like to produce deep impurity or defect levels, that are located near the middle of the band gap. Galium Arsenide (GaAs) and the other compound semiconductors, of a type which is semi-insulating, with a resistivity of about $10^7$ to $10^8$ ohm-centimeters, and having impurities or defects such as doping of a density of $10^{16}$ to $10^{18}$ doping defects per cubic centimeter, is suitable. The chip is in the form of a parallelepiped, and the crystalline Galium Arsenide is preferably oriented so that the surfaces 62, 64 through which light passes are in the ($0\bar{1}1$) or (011) directions, but preferably not in the (100) direction (the latter produces some but a lesser photorefractive effect). Galium Arsenide produces a photorefractive effect for light in the infrared range.

When two coherent light beams are incident on the area of a chip of photorefractive material, but the light beams move in directions 70, 72 (FIG. 2) that are angled by an angle A from each other, the beams produce a grating effect in the material. The grating effect results in the light from one of the beams being transferred to the other beam. If we ignore absorbtion of light by the photorefractive material, the intensity of one of the beams 70 will be enhanced so that the corresponding emerging beam 70e will have a higher intensity than the incident beam 70. The other incident beam 72 will lose some of its intensity so the emerging beam 72e will have a lower intensity than the incident beam 72. The transference of light from one beam to the other is not linear with beam intensity, but the percentage of light transferred from one beam to the other can increase with the intensity of the beam.

FIG. 3 illustrates the relationship between the output intensity of the weaker of the two output beams, and the input intensity of each of two beams striking the same surface area of a light transfer device, for different values of LZ for the particular light transfer device. L is the gain per unit thickness of the chip of photorefractive material of the light transfer device, while Z is the thickness of the chip. One of the graphs for LZ=2.0 is for a Galium Arsenide chip of a thickness of 0.3 centimeters, and represents the LZ for infrared light of a wavelength of 1.15 micrometers. It can be seen that at point 80, where the input light intensity is 0.5 mW/cm$^2$ (milliwats per square centimeter), the output light intensity is about 0.2 mW/cm$^2$, so the gain is about 0.5. At the point 82, the input is 50 mW/cm$^2$, and the output is about 6 mW/cm$^2$, so the gain is about 0.12, or about one fourth of what it is at the lower level of point 80. The gain per unit thickness L can be increased by establishing an electric field largely parallel to the surfaces of the chip through which light passes. FIG. 1 shows a pair of electrodes 90, 92 and a voltage source 94, for establishing an electric field through the chip. An electric field intensity such as 5 kilovolts per centimeter greatly increases the variation in gain per unit thickness L. FIG. 3 shows a graph where LZ=5.0, obtained with such an electric field intensity where LZ=2.0 without the electric field. It can be seen that the compression of range of light intensity is even greater than at LZ equals 2.0.

As shown in FIGS. 1 and 2, it is desirable that the groups of light beams 34, 36 be directed as coincident images on the surface 62 or in a plane between the surfaces 62, 64 of the chip. This has the advantage that an intense light beam from one group of light rays overlap an intense light beam of the other group for maximum effect. However, it is instead possible to use one group of light beams such as 36 which are all of uniform intensity and that uniformly cover the surface 62 of the chip. The variation in gain LZ will not be as great, but can still be substantial.

Although compression of the range of light intensities is a highly useful result of the apparatus of the invention, it should be noted that the apparatus also provides a second emerging group of light beams 48 (FIG. 1) where the range of intensities is expanded. In the light beam group 48, intense light beams are made even more intense, while dim light beams are made even dimmer. Such a light beam can be useful in providing greater contrast, so as to facilitate identifying brighter portions of a scene, where the range of intensities is not great.

Figure 4:
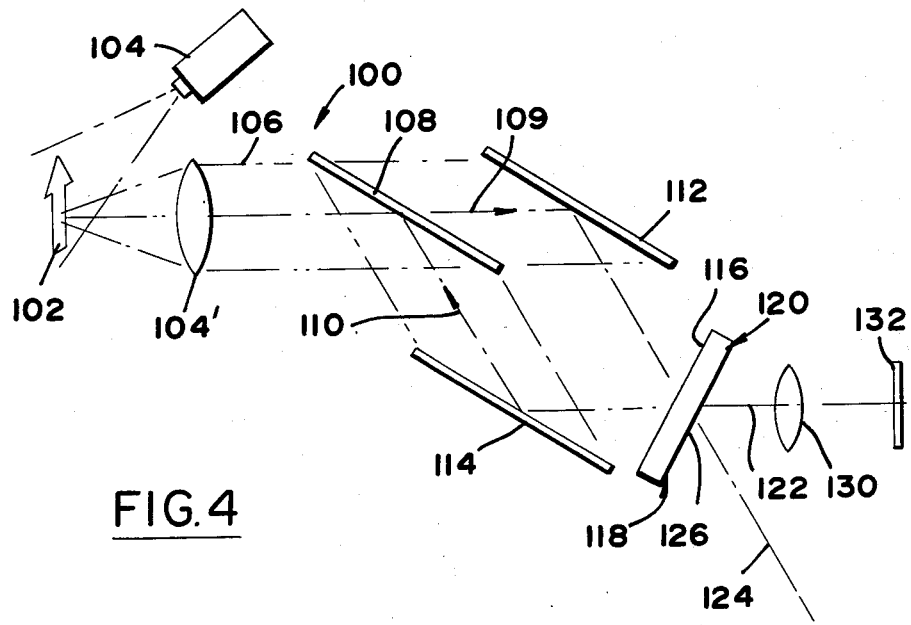
FIG. 4 is a view of apparatus constructed in accordance with another embodiment of the invention.

FIG. 4 illustrates another apparatus or system 100 where an object 102 produces reflected light rays. A source 104 of coherent light, such as a laser, is directed at the object 102, as well as the background surrounding the object. Reflected light from the object 102 passes through a lens 104' to produce a first group of light rays 106. A beam splitter 108 splits the light beams into second and third groups of light beams 109, 110, that are reflected off mirrors 112, 114 onto a front surface 116 of a chip 118 of a light transfer device 120. The lens 104 is chosen to form the second and third groups of light beams into coincident images of the object at the chip 118. Two groups of emerging light beams 122, 124 emerge from the rear surface 126 of the chip, the first emerging group 122 being the weaker one, and the other 124 being the stronger one. A lens 130 forms an image of the object from the first emerging group of light beams 122 onto a video detector 132.

Applicant prefers to illuminate the object with coherent light, split the group of beams from the object into two component groups of beams, and pass the two component beams along equal paths to the chip of photorefractive material. The compression/expansion effect can also be obtained by illuminating the object with light of substantially one color from a largely point source. Applicant has not been able to obtain the effect with light of a range of wavelengths, or colors, from a wide aperture light source, but with a chip of a suitable photorefractive material this is possible.

Thus, the invention provides an apparatus for the amplification of light as a nonlinear function of the intensity of the light from a source. The apparatus includes a light transfer device formed of a photorefractive crystal material. Two groups of light beams from the source are directed at a surface of the light transfer device, each group of light beams representing a two-dimensional array of light beams in cross section, and with at least one of the groups of light beams having beams of different intensities. The two groups of light beams are directed at angles from one another. One of the groups of light beams emerging from the light transfer device has experienced compression of the range of light intensities, while the other group of light beams has experienced expansion of the range of light intensities.

Although particular embodiments of the invention have been described and illustrated herein, it is recognized that modifications and variations may readily occur to those skilled in the art and consequently it is intended to cover such modifications and equivalents.

What is claimed is:

1. Apparatus for the amplification of light as a nonlinear function of the intensity of light from a source comprising:
    a light transfer device which is formed of a photorefractive material and which has a surface;
    means for directing a first group of light beams from said source at said surface of said light transfer device at a known angle from said surface to create a two-dimensional pattern of said beams near said surface wherein some locations of said pattern contain light of a higher intensity than other locations thereon;
    means for directing a second group of light beams at said surface of said light transfer device, at a second angle that is different from said known angle, wherein said first and second groups of light beams are each substantially coherent;
    means for sensing one of said groups of light beams after it has passed through said light transfer device.

2. The apparatus described in claim 1 wherein:
    said means for directing a first group and said means for directing a second group comprises means for splitting a two-dimensional array of light beams emanating from an object to obtain said first and second groups of beams.

3. The apparatus described in claim 1 including:
    means for applying an electric field to said photorefractive material in a direction substantially in the plane of said surface.

4. The apparatus described in claim 1 wherein:
    said photorefractive material is semi-insulating and doped in an amount that results in deep impurity levels.

5. The apparatus described in claim 1 wherein:
    said photorefractive material is substantially in the form of a parallelopiped with $0\bar{1}1$, 011, and 100 directions that are mutually normal, and said surface is normal to one of said directions which is chosen from the set consisting of the $0\bar{1}1$ and 011 directions.

6. The apparatus described in claim 1 wherein:
    said light transfer device comprises a chip of gallium arsenide having a resistivity of about $10^7$ to $10^8$ ohm-centimeters and a defect density of about $10^{16}$ to $10^{18}$ per cubic centimeter.

7. Apparatus for compressing the range of intensities of light, comprising:
    a chip of a photorefractive crystal material which has first and second opposite surfaces;
    means for receiving a two-dimensional array of light beams representing an image having areas of different light intensities, and splitting the array of light beams into first and second two-dimensional arrays of light beams that each represent said image;
    means for directing said first and second arrays onto said first surface of said chip, along directions that are angled from each other, with the images represented by said first and second arrays being coincident substantially within said chip;
    means for detecting the less intense of the arrays of light beams emerging from said second surface of said chip.

8. The apparatus described in claim 7 including:
    means for illuminating an object with coherent light, and said means for receiving is positioned to receive said coherent light after it has interacted with said object.

9. A method for the amplification of each of the beams of a two-dimensional array of light beams representing an image, as a nonlinear function of the intensity of the light of each beam, comprising:
    directing at least a portion of the intensity of each of the beams of said array of light beams at a first surface of a chip of photorefractive material which also has an opposite second surface, including forming said image substantially at said first surface;
    directing a second two-dimensional array of light beams at an area of said first surface of said chip where said image is formed;
    detecting a two-dimensional array of light beams emerging from said second surface of said chip.

* * * * *